United States Patent [19]

Gentiluomo

[11] Patent Number: 4,789,853
[45] Date of Patent: Dec. 6, 1988

[54] DETECTION DEVICE FOR ELECTRICALLY CONDUCTIVE FLUIDS

[76] Inventor: Joseph A. Gentiluomo, 1456 Belmont Ave., Schenectady, N.Y. 12308

[21] Appl. No.: 61,585

[22] Filed: Jun. 15, 1987

[51] Int. Cl.[4] ........................................... G01B 21/00
[52] U.S. Cl. ................................. 340/604; 200/61.04
[58] Field of Search ...................... 340/603, 604, 605; 200/61.04, 61.05; 361/178; 439/148, 179; 137/312

[56] References Cited

U.S. PATENT DOCUMENTS

| | | | |
|---|---|---|---|
| 3,874,403 | 4/1975 | Fischer | 200/61.04 |
| 4,305,420 | 12/1981 | Nussdorf | 200/61.04 |
| 4,356,479 | 10/1982 | Wilson | 340/604 |
| 4,380,243 | 4/1983 | Braley | 340/604 |
| 4,418,712 | 12/1983 | Braley | 340/604 |
| 4,593,275 | 6/1986 | Kazandjoglou | 340/604 |
| 4,684,327 | 8/1987 | Gentiluomo | 417/33 |

FOREIGN PATENT DOCUMENTS 2539279  3/1977  Fed. Rep. of Germany ...... 361/178

*Primary Examiner*—Michael J. Tokar
*Assistant Examiner*—Hezron E. Williams

[57] ABSTRACT

A device for detecting the presence of electrically conductive fluids, and upon such detection functioning to provide an audio alarm signal, and/or terminate electrical power to equipment that is causing fluid leakage. When used in conjunction with a washing machine, wherein the tube over-flows, or the pump or pump discharge hose leaks to cause water spillage, or where leakage occurs from the machine's cold or hot water supply hoses, the device will operate to deactivate the water pump and water supply solenoid valves, and provide an audio signal. Also, the device may be used to provide an audio alarm signal, and/or provide electrical power to a stand-by emergency pump to withdraw fluids, and prevent flooding. The device features a fluid sensing unit and a control unit operating on 90 to 125 volts AC low current. The fluid sensing unit has adjacently disposed large surface area neutral and hot contacts to allow sufficient current to flow between contacts and through the electrically conductive fluid, to improve circuit breaker response. When fluid accumulates between the neutral and hot contacts, a circuit is completed to instantaneously trip the circuit breaker to control electrical power to the outlet socket, and activate the audio alarm.

17 Claims, 1 Drawing Sheet

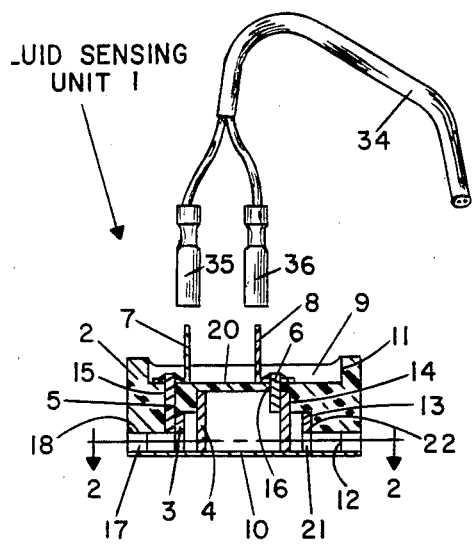
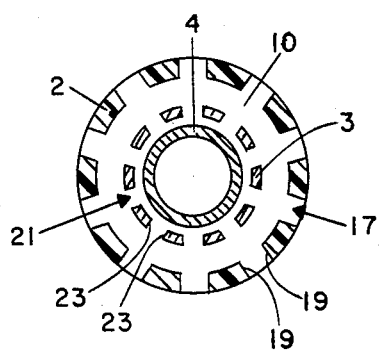
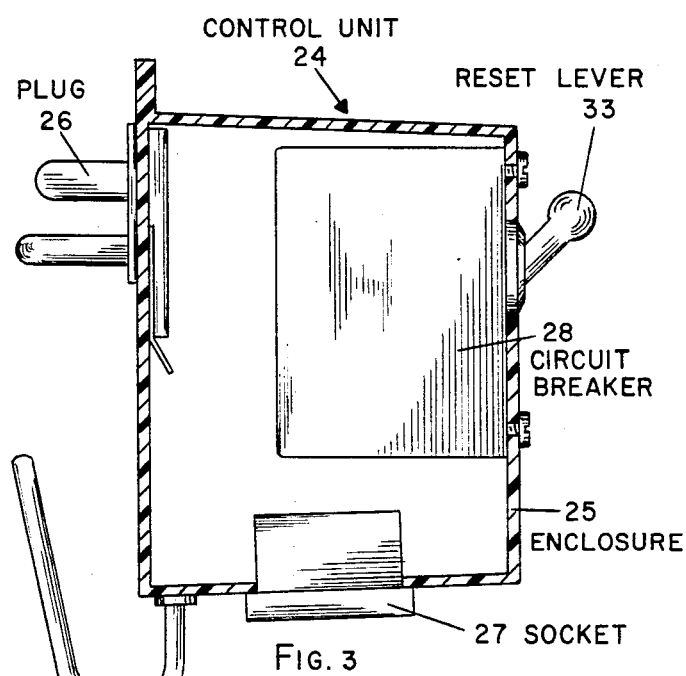
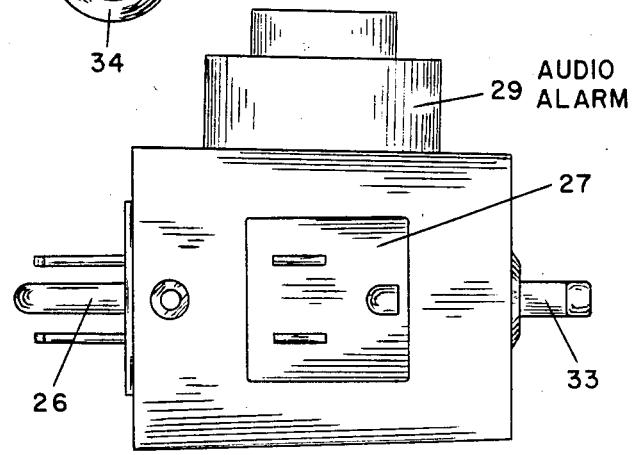
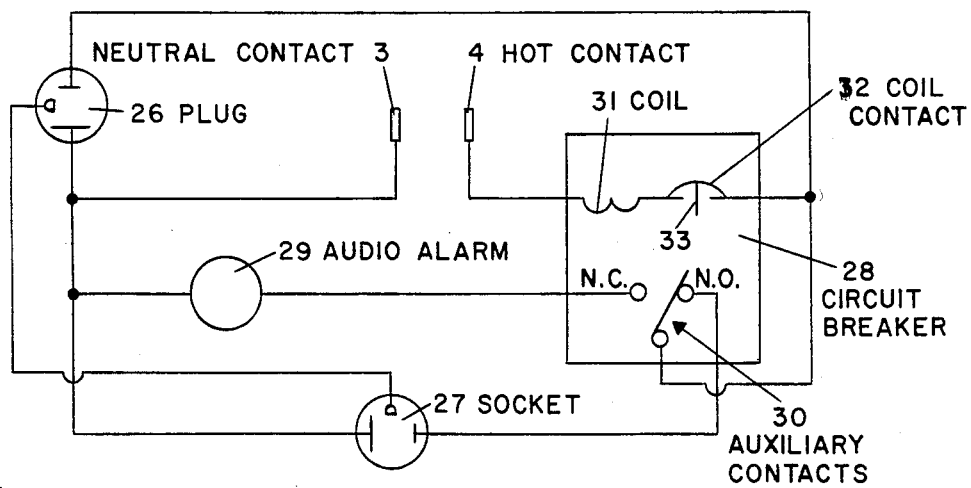

DETECTION DEVICE FOR ELECTRICALLY CONDUCTIVE FLUIDS

BACKGROUND OF THE INVENTION

This invention relates to a device for detecting the presence of electrically conductive fluids, and upon such detection functioning to provide an audio alarm signal, and/or terminate electrical power to equipment that is causing fluid leakage. More particularly, this invention can be used to detect any malfunction in the operation of a washing machine. Should the machine tub becomes inadvertently over-filled due to failure of the level sensing system or should the pump or pump discharge hose leak to cause water spillage, or should leakage occur from the machine's cold or hot water supply hoses, the device will operate to deactivate the machine's water pump and supply solenoid valves, and provide an audio signal. Also, a further use of this invention would be to sense basement flooding, and utilize the control unit to activate a stand-by emergency pump and audio alarm. The fluid detection device of this invention consists of a control unit operatively associated with a fluid sensing unit for monitoring fluid leakage.

Numerous moisture detection devices are available, such as disclosed in U.S. Pat. No. 4,380,243. These devices operate on low direct current voltage, and are of electronic construction. Since households are provided with approximately 110 volts AC power, said voltage must first be stepped down and then converted to DC. Components to provide said functions add substantially to the cost of such moisture detection devices. The instant invention operates on low current 90 to 125 VAC, thus eliminating the need for the costly components associated with prior art moisture detection devices.

SUMMARY OF THE INVENTION

The instant invention features a fluid sensing unit operatively connected to a control unit, for monitoring fluid leakage and for providing maintained termination of electrical power to a washing machine's water pump and water supply solenoid valves. Also, should the cold and/or hot water supply hoses and/or pump discharge hose leak, the detection device will operate to provide an audio alarm signal.

The fluid sensing unit is positioned on the floor behind or underneath the washing machine. Should water spill upon the floor, it will enter the fluid sensing unit to surround the neutral and hot contacts. In so doing, an electrical circuit will be completed to provide a signal to the control unit to trip the circuit breaker when the current flow exceeds the low value of approximately 0.020 to 0.060 amperes. It should be noted that adjacent surface areas between the hot and neutral contacts that are wetted by electrically conductive fluid such as water, must be of such magnitude as to allow sufficient current to flow therebetween, for circuit breaker tripping. The greater the magnitude of surface area between the hot and neutral contacts wetted by water, and the smaller the gap between said contacts, the faster will be the response of the circuit breaker.

The main advantage of this invention over prior art devices, relate to its simplicity in construction. Thereby, being more economical to build, and easier to maintain.

DESCRIPTION OF THE DRAWING

A more complete understanding of the invention may be ascertained by reference to the following detailed description of the invention, when taken in conjunction with the accompanying drawing, wherein:

FIG. 1 is a sectional view of the fluid sensing unit;

FIG. 2 is a cross-sectional view taken along plane 2—2 of FIG. 1;

FIG. 3 is a side view of the control unit, with the enclosure in section;

FIG. 4 is a bottom view of the control unit; and

FIG. 5 is an electrical schematic diagram of the control unit.

DESCRIPTION OF THE PREFERRED EMBODIMENT

With reference to FIGS. 1, 2, 3, 4, and 5, it can be discerned that the invention comprises a fluid sensing unit 1 for sensing the presence of a conductive fluid, and a control unit 24 for providing maintained termination of electrical power to a washing machine for de-energizing its water pump and water supply solenoid valves, and for activating audio alarm 29.

In the preferred embodiment depicted in the drawing, fluid sensing unit 1 comprises circular body 2, neutral annular contact 3, hot annular contact 4, connecting wires 5 and 6, right angle male tabs 7 and 8, potting compound 9, and thin insulation shield 10. Body 2 is made from a dielectric material, such as plastic, having bore 11 at the top end, and outer bore 12, intermediate bore 13, and inner bore 14 at the bottom end, which are concentric to each other and stepped progressively inward. In addition, body 2 has holes 15 and 16 to accommodate the passage of connecting wires 5 and 6, and a plurality of radially disposed cut-outs 17 at the bottom which are defined by upper surface 18 and side surfaces 19. Also, neutral annular contact 3 has at its bottom end a plurality of radially disposed cut-outs 21 defined by upper surface 22 and side surfaces 23. Fluid sensing unit 1 is fabricated by securing the hot annular contact 4 within inner bore 14, and the neutral annular contact 3 within intermediate bore 13. Right angle male tab 7 is located within bore 11 upon surface 20, and interconnected to neutral annular contact 3 by means of copper wire 5, whose ends are soldered to the tail of male tab 7 and to the outer top surface of neutral annular contact 3. Right angle male tab 8 is also located within bore 11 upon surface 20, and interconnected to hot annular contact 4 by means of copper wire 6, whose ends are soldered to the tail of male tab 8 and to the inner top surface of hot annular contact 4. Bore 11 is then filled with potting compound 9 to permanently encapsulate male tabs 7 and 8 within body 2. Insulation shield 10 can be made from a thin sheet of rubber or plastic adhered to the bottom surfaces of body 2, neutral contact 3, and hot contact 4. As an alternative, insulation shield 10 may be eliminated completely, or the bottom ends of the neutral and hot annular contacts 3 and 4 coated with wire insulating enamel.

Control unit 24 includes enclosure 25 of such construction as to mount directly to an electrical wall receptacle. Secured to the back face of enclosure 25, is plug 26 having protruding prongs for engagement with the electrical wall receptacle. Mounted to the bottom face of enclosure 25 is commercially available socket 27, for receiving the washing machine power supply cord plug. Also, the bottom face of enclosure 25 has a two conductor electrical lead 34 protruding therefrom, for connection to male tabs 7 and 8 by means of quick disconnect terminals 35 and 36. Fixedly mounted to the front face of enclosure 25 is commercially available circuit breaker 28, and mounted to the side face is commercially available audio alarm 29. It should be noted that audio alarm 29 may be located remotely, and also have a switch connected in series with it for deactivation, if so desired.

In operation, with electrical power to plug 26 and with circuit breaker 28 in the "On" position, electrical power will be available to socket 27 through the normally open (N.O.) contacts of auxiliary switch contacts 30, for washing machine use. Should the washing machine tub overflow, and/or water pump, and/or pump discharge hose, and/or water supply hoses leak, fluid sensing unit 1 will receive water through the plurality of radial cut-outs 17 and 21. Said radial cut-outs 17 and 21 represent means for admitting fluid into the fluid sensing unit. The entering water will accumulate between neutral contact 3 and hot contact 4 to complete a circuit through said water and allow current to flow through coil contacts 32 and coil 31. It should be noted that said current must be of such magnitude as to energize circuit breaker coil 31 for instantaneous tripping of circuit breaker reset lever 33 to the "Off" position. In the "Off" position, coil contacts 32 will open to de-energize coil 31. Also, the normally open (N.O.) contacts of auxiliary switch 30 will become open to terminate power to socket 27, and the normally closed (N.C.) contacts will close to activate audio alarm 29. Circuit breaker 28 can be manually reset to the "On" position by moving reset lever 33 up-ward to the un-tripped position, to reset coil contact 32 to the closed position. Also, the normally closed (N.C.) contacts of auxiliary switch 30 will become open, and the normally open (N.O.) contacts will become closed, such as shown in FIG. 5.

Having thusly described the invention, the following is claimed:

1. A fluid detection device, comprising:
    (a) a fluid sensing unit having a body made of dielectric material; enclosed within said body are fixedly mounted neutral and hot contacts having (substantially vertical adjacent surfaces whose) surface areas (are) substantially equidistantly disposed from each other, throughout; said fluid sensing unit having means for admitting fluid to said neutral and hot contacts; and
    (b) a control unit operatively associated with said fluid sensing unit for monitoring fluid leakage; said control unit including a manually resetable low current tripping (alternating current) circuit breaker having an "on position" and a maintained "off position"; said circuit breaker being further characterized as having a current limiting coil for limiting the magnitude of current flow between said neutral and hot contacts, circuit breaker contacts, and a lever switchable between an "on position" and an "off position"; said circuit breaker contacts being operatively interconnected to said lever such that when a conductive fluid bridges said neutral and hot contacts, said coil is energized such as to instantaneously switch said circuit breaker from said "on position" to said "off position".

2. The invention as defined by claim 1, wherein said circuit breaker is further characterized as operating on 90 to 125 volts alternating current, (and including coil contacts, auxiliary switch contacts, and a coil in series with said coil contacts; both coil contacts and the normally open (N.O.) contacts of said auxiliary switch contacts switch to the maintained off position when current through said coil exceeds a predetermined low value for tripping said circuit breaker, after a circuit is completed through said contacts of said fluid sensing unit.) and said circuit breaker contacts are further characterized as coil contacts and normally open and normally closed auxiliary contacts; said coil contacts being in series with said current limiting coil; also said coil contacts, said normally open (N.O.) auxiliary contacts, and said lever, switch to said maintained "off position" when current through said coil exceeds a predetermined value.

3. The invention as defined by claim 2, wherein said control unit is further characterized as including a plug and a socket; said plug, socket, coil, coil contacts, and auxiliary contacts being electrically interconnected with said fluid sensing unit.

4. The invention as defined by claim 3, wherein said control unit is further characterized as including an audio alarm connected to the nomally closed (N.C.) contact of said auxiliary switch contacts.

5. The invention as defined by claim 4, wherein said fluid sensing unit is further characterized as including neutral and hot male tabs electrically interconnected to said neutral and hot contacts, respectively.

6. The invention as defined by claim 5, wherein said fluid sensing unit is further characterized as including an insulation shield fixedly mounted to the bottom thereof.

7. The invention as defined by claim 6, wherein said neutral and hot contacts of said fluid sensing unit are further characterized as being annular in shape.

8. A fluid detection device, comprising:
    (a) a fluid sensing unit having a body made from dielectric material and characterized by a top end and a bottom end; mounted within the top end of said body are neutral and hot male tabs; mounted within the bottom end of said body are neutral and hot contacts; said neutral contacts being electrically interconnected to said neutral male tab, and said hot contact being electrically interconnected to said hot male tab; said fluid sensing unit having means for admitting fluid to said neutral and hot contacts; and
    (b) a control unit operatively associated with said fluid sensing unit for monitoring fluid leakage; said control unit including a manually resetable low current operating 90 to 125 volt alternating current circuit breaker.

9. The invention as defined by claim 8, wherein said control unit is further characterized as including an audio alarm electrically connected to said circuit breaker.

10. The invention as defined by claim 9, wherein said neutral and hot contacts have substantially vertical adjacent surfaces whose surface areas are substantially equidistantly disposed from each other, throughout.

11. A fluid detection device for use in conjunction with a washing machine having a water pump and water supply solenoid valves, comprising a fluid sensing unit having a circular body made from dielectric material and characterized by a top end and a bottom end; mounted within the top end of said circular body are neutral and hot male tabs having encapsulated lower portions; said circular body's bottom end having an outer bore, intermediate bore, and inner bore which are stepped progressively inward and concentric to each other; said inner bore having a hot annular contact secured therein, and interconnected to said hot male tab by means of copper wire; said intermediate bore having a neutral annular contact secured therein, and interconnected to said neutral male tab by means of copper wire; said neutral annular contact having a plurality of radially disposed cut-outs at its bottom end; and said circular body having a plurality of radially disposed cut-outs at its bottom which are intermediate its outside surface and its outer bore.

12. The invention as defined by claim 11, further characterized as including a control unit operatively associated with said fluid sensing unit for terminating electrical power to said washing machine's water pump and water supply solenoid valves, when electrically conductive fluid is detected by said fluid sensing unit.

13. The invention as defined by claim 12, wherein said control unit is further characterized as including a manually resetable low current tripping circuit breaker operating on 90 to 125 volts alternating current.

14. The invention as defined by claim 13, wherein said circuit breaker is further characterized as including coil contacts, auxiliary switch contacts, and a coil in series with said coil contacts; both coil contacts and the normally open (N.O.) contacts of said auxiliary switch contacts switch to the maintained off position when current through said coil exceeds a predetermined low value for tripping said circuit breaker, after a circuit is completed through said contacts of said fluid sensing unit.

15. The invention as defined by claim 14, wherein said control unit is further characterized as including a plug and a socket; said plug, socket, coil, coil contacts, and auxiliary switch contacts being electrically interconnected with said fluid sensing unit.

16. The invention as defined by claim 15, wherein said control unit is further characterized as including an audio alarm connected to the normally closed (N.C.) contact of said auxiliary switch contacts.

17. The invention as defined by claim 16, wherein said fluid sensing unit is further characterized as having an insulation shield secured to the bottom faces of said circular body, and said neutral and hot contacts.

* * * * *